Aug. 10, 1937.  E. F. LABADIE  2,089,213
WELDING
Filed Aug. 3, 1936  2 Sheets-Sheet 1
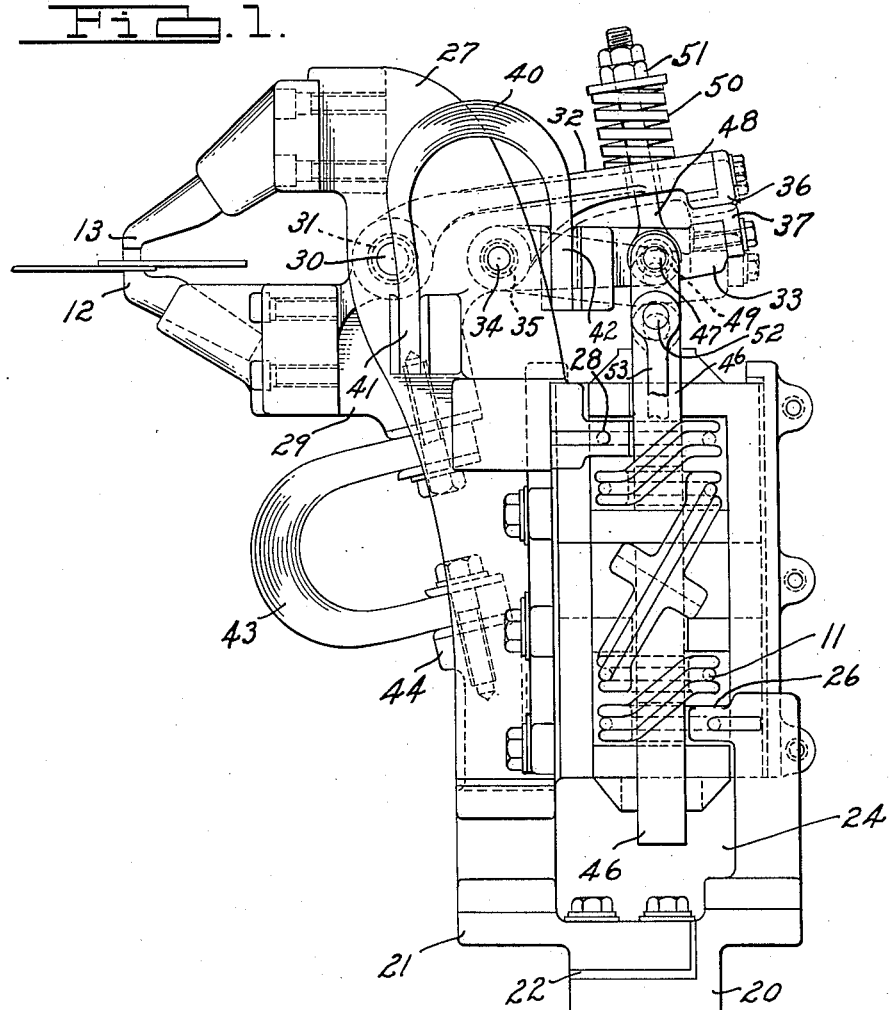
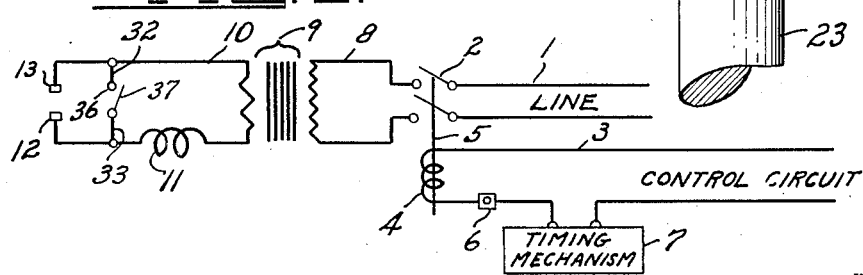
INVENTOR.
Edwin F. Labadie
BY
Barnes, Kisselle, Laughlin & Raisch
ATTORNEYS.

Aug. 10, 1937. E. F. LABADIE 2,089,213
WELDING
Filed Aug. 3, 1936 2 Sheets-Sheet 2

INVENTOR.
Edwin F. Labadie
BY Barnes, Kisselle, Laughlin & Raisch
ATTORNEYS.

Patented Aug. 10, 1937

2,089,213

UNITED STATES PATENT OFFICE 2,089,213

WELDING

Edwin F. Labadie, Detroit, Mich., assignor to General Motors Corporation, Detroit, Mich., a corporation of Delaware Application August 3, 1936, Serial No. 94,029

20 Claims. (Cl. 219—4)

This invention relates to the art of welding, and it has to do particularly with electrical welding.

The invention may be employed in welding where use is made of a low voltage, high amperage electrical current. In welding two or more pieces of work together, one manner of procedure is to dispose the work in overlapping relation and apply electrodes to opposite sides thereof. The electrodes are applied with requisite pressure and the current passed from one electrode to another through the work and the pressure afforded by the electrodes aids in the welding. This procedure is followed in what is generally termed "spot welding". The electrodes should be applied to the work preferably with some pressure before the heavy welding current passes through the work, else too high a heat is generated if the current is effective as the electrodes come against the work, which may unduly burn the metal and otherwise produce an inefficient weld.

The present invention is directed to an improvement in welding and welding apparatus wherein electromagnetic force is used for providing the pressure with which the electrodes engage the work, which force is attained by the use of a solenoid in the secondary or welding circuit; that is the welding current which passes across the electrodes. Further, the invention is directed to a development wherein the electrodes are automatically applied to the work incident to the operation of the welder, and this is preferably done by electromagnetic action. Electromagnetic action not only provides the welding pressure, but initiates the movement of the electrodes toward and into engagement with the work, which engagement continues with pressure during the welding operation. The holding of electrodes against the work with pressure by means of electromagnetic force obtained from the welding circuit has been heretofore proposed, but it was necessary to first apply the electrodes to the work or to initiate movement of the electrodes toward the work by some hand operated means. The present invention provides a machine of a more automatic nature in which the making of an electrical circuit provides, in effect, a motivating force for moving the electrodes against the work, and then the welding circuit provides the pressure during the welding operation. This is done, in accordance with the invention, without initially electrically connecting the electrodes in the welding circuit, so that the current does not flow through the work before adequate pressure has been applied. In other words, when current is set up, the electrodes are moved against the work but substantially no current passes through the work, and then after a suitable pressure exists the welding current is caused to flow across the electrodes and through the work for welding purposes.

To these ends one form of a welding device is provided which has two paths of flow for the welding current. One path is through a shunt connected in series with a solenoid so that the solenoid is energized when the circuit is closed to thus, by acting upon an armature, cause the electrodes to move into engagement with the work. The other path is across the electrodes which are connected in parallel with the shunt. The organization of the mechanism is such that when the electrodes are applied to the work with a determined or requisite pressure, the circuit through a shunt is discontinued, and this is accomplished by a switch arrangement or contact members which open or separate after the electrodes have been applied to the work with pressure. Upon the opening of the switch arrangement in the shunt, the secondary or welding circuit has but one path and that is across the electrodes and through the work. The invention, as mentioned above, is applicable to the so-called spot welding practice and such an apparatus is shown in the accompanying drawings, but the invention is not limited to use on such a welding machine but may be made applicable to other types of electrical welding.

In the accompanying drawings:

Fig. 1 is a side elevational view with some parts cut away illustrating a welding device embodying the invention.

Fig. 3 is a diagrammatic view illustrating the electrical system.

Figure 2:
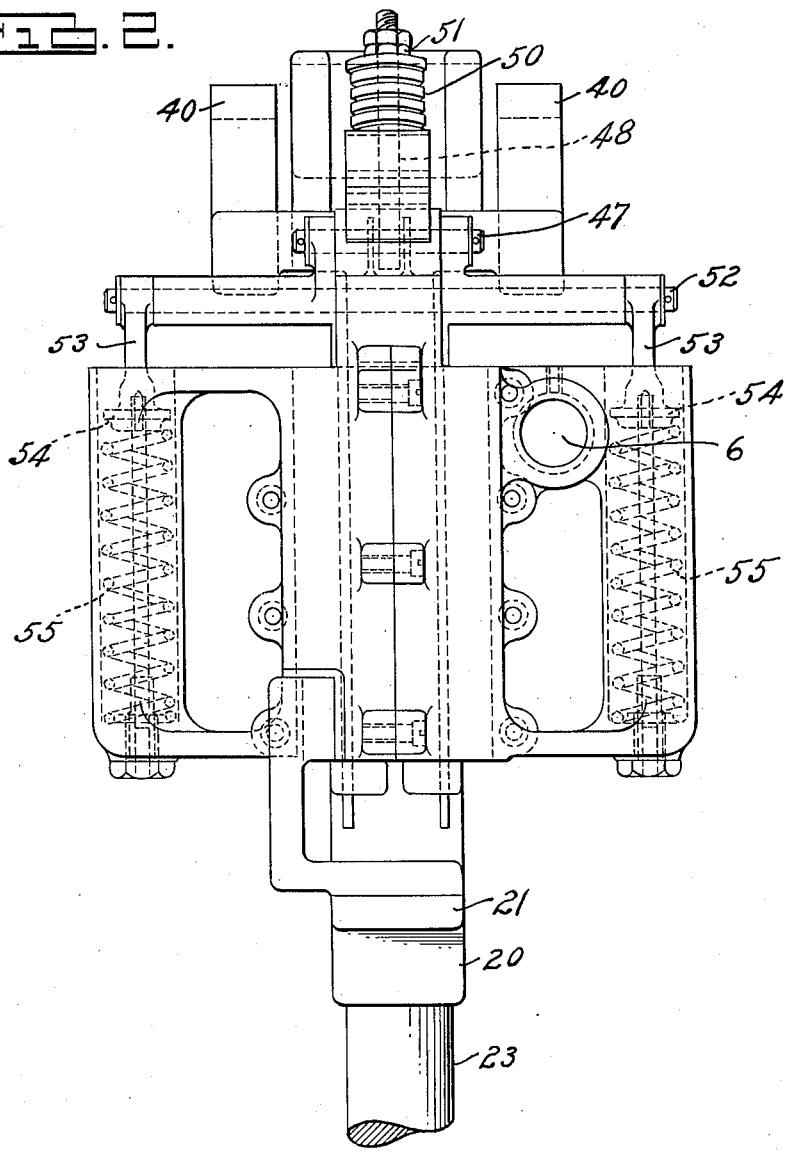
Fig. 2 is a view mostly in side elevation looking at right angles to Fig. 1.

The particular device shown in the drawings is a welding device of the so-called portable type. The device is portable in that it is designed to be shifted relative to the work and applied thereto in different places while the work may remain substantially at rest. The invention lends itself advantageously to such welders as it facilitates the operation of portable welders, although of course the invention is not limited to portable welders.

It is thought that reference may first be made to the wiring diagram of Fig. 3. Alternating current may be supplied through the lines 1 in which there is a switch 2. A control circuit 3 is provided with a solenoid 4 for acting upon an armature 5 to close the switch 2. A control switch is shown at 6, which an operator operates to make the control circuit, thus to close the switch 2. A suitable timing mechanism 7 may be used to determine the time that the control circuit is used, and it will be appreciated that when the timing mechanism opens the control circuit, the switch 2 opens and the welding operation is completed. So much of the system, however, is well known to those versed in the art. The primary circuit is illustrated at 8, a transformer at 9 and a secondary circuit at 10 provided with a solenoid 11. The electrodes in the secondary circuit, sometimes called the welding circuit herein, are shown at 12 and 13; and connected into the secondary circuit in parallel with the electrodes, as shown in Fig. 3, is a shunt 32—33 in which there is a switch 36—37. This switch is normally closed and the function will be brought out later in connection with the physical structure of the apparatus.

Referring now to Fig. 1, the welder has a terminal piece 20 and a terminal piece 21 suitably insulated as at 22, and these terminal pieces may be connected to conductors, not shown, confined in a hose or the like 23, though water may be circulated for cooling the conductors. It will be understood that in a portable welder of this type, the transformer is located relatively remote and that the welding current is conveyed through the conductors to the terminal pieces 20 and 21.

The body of the welder is hollow in its interior as shown at 24, and mounted therein is the solenoid 11 constituted by windings as shown. The terminal piece 20 connects to the solenoid as at 26. The electrode 13 is stationary relative to the body and it is carried by the body of the welder through a body piece or support 27. This support 27 connects to one end of the solenoid as at 28. The electrode 12 is the movable electrode and it is mounted on a rockable supporting element 29 pivoted to the support 27 as at 30 suitably insulated therefrom by insulation 31. The member 27 may be of bifurcated construction with the member 29 passing through the spaced parts thereof. The member 29 has an extending arm 32.

Pivotally secured to the electrode holder 29 is a member 33, the pivotal connection being illustrated at 34, and this connection embodying insulation 35. The portions 32 and 33 constitute part of the shunt, and further, constitute the make and break or switch of the shunt, for which purpose they carry suitable contact pieces 36 and 37.

In order to aid in comparing the structure to the diagram the reference characters 32 and 33, as well as the characters 36 and 37 have been applied to the shunt and switch shown in the diagrammatic view.

The body 27 is electrically connected to the arm 33 by one or more flexible conductors commonly termed jumpers as at 40, one end of each being connected to the body 27 as at 41 and the other to the arm as at 42. The electrode holder 29 is electrically connected to the terminal 21 by means of a jumper 43, the terminal 21 extending upwardly forming an abutment 44 for the reception of one end of the jumper, it being understood that the terminal 21 and its part 44 are electrically insulated from the body of the tool, including the support 27.

An armature 46 is connected to the arm 33 advantageously by a pivotal connection provided by a pin 47. A link 48 is also swiveled on this pin and insulated therefrom by insulation 49, and this link extends through an enlarged aperture in the extension 32 and is associated with extension 32 through the means of a compression spring 50, the tension of which is determined by nuts 51.

A cross pin 52 is carried by the armature and on opposite sides are depending links 53 which have plunger-like ends 54 working in recesses in the body of the tool, as shown in Fig. 2. The body of the tool has some width as shown, and in these recesses are compression springs 55. These compression springs urge upwardly upon the electrode and normally hold the armature upwardly, thus in turn holding the arm 33 upwardly with the contacts 36 and 37 in contacting relation, with the upward position limited by the upward limit of movement of the arm 32 of the movable electrode carrier.

In operation the work is placed between the electrode; if the welder be portable the welder is moved relative to the work; if the welder is of the fixed type the work is moved in between the electrodes. The operator now closes the switch 6, which closes the switch 2. Thus the welding circuit is energized. The circuit through the structure is along the following path: the terminal piece 20, the solenoid 11, the support 27 for the fixed electrode, the jumpers 40, arm 33, across the contacts 36 and 37, into the arm 32 of the movable electrode holder, across the jumper 43, into the terminal piece 21. Accordingly, it will be noted that while the electrodes are electrically connected no current passes therethrough as long as there is no contact of electrodes with the work, the circuit cutting short of the electrodes through the shunt. The shunt is constituted by the jumpers 40, arm 33, contacts 36 and 37, and arm 32 of the movable electrode holder. This energizes the solenoid and the armature 46 is pulled downwardly. This compresses the springs 55, and in initial movement, the arm 33 and the movable electrode move in unison around the fulcrum point because the spring 50 is effective to rock the movable electrode. During this movement the welding circuit is passed through the shunt. The electrodes now come into contact with the work and continued movement of the armature compresses the spring 50 and applies the electrodes to the work with requisite pressure. As the spring 50 compresses the contacts 36 and 37 separate and the arm 33 swings around its pivot 34 upon further downward movement of the armature. When the current is initially established, as pointed out above, it runs through the shunt. As the electrodes come into contact with the work the shunt is still fully effective and offers less resistance than the electrodes and work so that there is substantially no current across the electrodes and through the work until adequate pressure has been applied and the shunt broken at the contact members. This welding position of the parts is shown by the dotted lines of Fig. 1. When the welding is completed the timing mechanism functions to break the control circuit, thus opening the controlling switch 2, and the springs 55 return the parts to the full line position shown in Fig. 1, with the electrodes clear of the work.

Thus it will be noted that the device is of an automatic nature, only requiring that the operator close the switch 6 to make the circuit. The electromagnetic force of the solenoid applies pressure to the work but there is no appreciable current through the work at this time, and the full force of the current is not effective upon the work until the switch in the shunt is broken; thus, although the welding circuit functions to apply the welding pressure, it is not necessary that an operator, through some other means or agency, apply the electrodes to the work with pressure prior to the energization of the welding circuit.

The electrodes may be water cooled following the usual practice, and the solenoid may be water cooled by the flowing of a current of water through the chamber 24, but such water cooling is well known to those versed in the art and need not be gone into in detail herein.

I claim:

1. An electrical welding apparatus comprising, a pair of relatively movable electrodes for connection in a welding circuit and between which work is to be placed, a solenoid in the welding circuit, a shunt in the circuit across the electrodes, an armature acted upon by the solenoid for closing the electrodes against the work, and means for opening the shunt subsequent to the closing of the electrodes against the work.

2. An electrical welding apparatus comprising, a pair of relatively movable electrodes for connection in a welding circuit and between which work is to be placed, a solenoid in the welding circuit, a shunt in the circuit connected in parallel with the electrodes, an armature acted upon by the solenoid upon energization of the welding current for closing the electrodes against the work, and means for opening the shunt subsequent to the closing of the electrodes against the work.

3. An electrical welding apparatus comprising, a pair of relatively movable electrodes for connection in the welding circuit and between which work is to be placed, a solenoid in the welding circuit, a normally closed shunt in the welding circuit connected in parallel with the electrodes, an armature acted upon by the solenoid upon establishment of the welding circuit for closing the electrodes against the work, and means for opening the shunt subsequent to the closing of the electrodes against the work.

4. An electrical welding apparatus comprising, a pair of relatively movable electrodes for connection in the welding circuit and between which work is to be placed, a solenoid in the welding circuit, a shunt in the circuit connected in parallel with the electrodes and including a normally closed switch structure, an armature acted upon by the solenoid upon establishment of current in the welding circuit for closing the electrodes against the work, and means operable incident to pressure exerted by the electrodes upon the work for opening the switch structure in the shunt.

5. An electrical welding apparatus comprising, a pair of relatively movable electrodes for connection in the welding circuit and between which work is to be placed, a solenoid in the welding circuit, a shunt in the circuit connected in parallel with the electrodes, an armature acted upon by the solenoid for closing the electrodes against the work upon establishment of current in the welding circuit, and means operable incident to pressure of the electrodes against the work for breaking the electrical conductivity of the shunt.

6. An electrical welding apparatus comprising, a pair of relatively movable electrodes for connection in the welding circuit and between which work is to be placed, a solenoid in the welding circuit, a shunt in the circuit connected in parallel with the electrodes, an armature acted upon by the solenoid for closing the electrodes against the work upon establishment of current in the welding circuit, and means operable incident to and subsequent to pressure of the electrodes against the work for breaking the electrical conductivity of the shunt.

7. An electrical welding apparatus comprising, a pair of relatively movable electrodes for connection in a welding circuit and between which work is to be placed, a welding circuit, means for establishing a current in said circuit, a solenoid energized upon the establishment of the said current, a shunt in the welding circuit connected in parallel with the electrodes, an armature acted upon by the solenoid for closing the electrodes against the work, and means for opening the shunt subsequent to the closing of the electrodes against the work.

8. An electrical welding apparatus comprising, a pair of relatively movable electrodes for connection in a welding circuit and between which work is to be placed, a welding circuit, means for establishing a current in said circuit, and means automatically operable upon the establishment of the said current for moving the electrodes into engagement with the work and for holding the electrodes in engagement with the work with pressure and for effecting flow of welding current across the electrodes and through the work only subsequent to the application of the electrodes to the work with pressure.

9. An electrical welding apparatus comprising, a pair of relatively movable electrodes for connection in a welding circuit and between which work is to be placed, a welding circuit, means for establishing a current in said circuit, a shunt in the said circuit for conducting the said current short of the electrodes, and means operable automatically upon the establishment of the said current for initiating relative movement of the electrodes toward engagement with the work and for applying the electrodes to the work with pressure, said means including a solenoid in the said circuit and an armature acted upon by the solenoid for exerting pressure of the electrodes on the work, and a switch structure associated with the shunt and arranged to be opened subsequent to the application of the electrodes to the work with requisite pressure.

10. An electrical welding apparatus comprising, a pair of relatively movable electrodes for connection in a welding circuit and between which work is to be placed, a welding circuit, means for establishing a current in said circuit, a solenoid energized upon the establishment of the said current, a shunt in the said circuit connected in parallel with the electrodes, an armature acted upon by the solenoid for closing the electrodes against the work, and means operable incident to the application of the electrodes against the work with pressure for opening the shunt.

11. An electrical welding apparatus comprising, a pair of relatively movable electrodes for connection in a welding circuit and between which work is to be placed, a solenoid in the welding circuit, a shunt in the circuit connected in parallel with the electrodes and including a normally closed switch structure, an armature acted upon by the solenoid upon establishment of current in the welding circuit for closing the electrodes against the work, means operable incident to pressure exerted by the electrodes upon the work for opening the switch structure in the shunt, and means for moving the electrodes out of engagement with the work and for closing the shunt upon the discontinuance of the welding current.

12. An electrical welding apparatus comprising, a fixed electrode, a movable electrode, said electrodes being arranged so that work may be placed therebetween and adapted for connection in a circuit for a welding current, a solenoid in the circuit, an arm movably mounted on an insulated connection with the movable electrode, an electrical connection between the arm and the fixed electrode, said arm and movable electrode having separable contact members, whereby current is shunted from one electrode to the other through said arm and contact members, an armature operably connected with the arm, and spring means interconnecting the arm and movable electrode whereby the armature shifts the movable electrode and arm in unison to apply the electrodes to the work, said spring flexing under pressure whereby the arm shifts relative to the movable electrode to separate the contact members and break the shunt.

13. An electrical welding apparatus comprising, a fixed electrode, a pivotally mounted electrode, said electrodes adapted to be connected into a circuit and to receive work therebetween, said electrodes being insulated one from the other, an arm mounted on the pivoted electrode by an insulated pivotal connection, a link insulated from and pivoted to the arm, said arm and pivoted electrode each having an electrical contact member, a spring associated with the link for holding the electrical contact members in engagement, electrical conducting means connecting the fixed electrode electrically with the arm, means providing a circuit for a welding current including a terminal piece for the movable electrode and a terminal piece for the fixed electrode, a solenoid electrically connected between one electrode and its terminal piece, an armature acted upon by the solenoid, means interconnecting the armature and said arm, whereby upon the establishment of current in said circuit the pivoted electrode and arm rock in unison on the mounting of the pivoted electrode, and upon the application of pressure against the work by the electrodes said spring flexes to permit separation of the electrical contact members, whereby current flows through the work between the electrodes.

14. An electrical welding apparatus comprising, a fixed electrode, a pivotally mounted electrode, said electrodes adapted to be connected into a circuit and to receive work therebetween, said electrodes being insulated one from the other, an arm mounted on the pivoted electrode by an insulated pivotal connection, a link insulated from and pivoted to the arm, said arm and pivoted electrode each having an electrical contact member, a spring associated with the link for holding the electrical contact members in engagement, electrical conducting means connecting the fixed electrode electrically with the arm, means providing a circuit for a welding current including a terminal piece for the movable electrode and a terminal piece for the fixed electrode, a solenoid electrically connected between one electrode and its terminal piece, an armature acted upon by the solenoid, means interconnecting the armature and said arm, whereby upon the establishment of current in said circuit the pivoted electrode and arm rock in unison on the mounting of the pivoted electrode and upon the application of pressure against the work by the electrodes, said spring flexes to separate the electrical contact members whereby current flows through the work between the electrodes, and spring means flexed by the movement of the armature and serving to disengage the electrodes from the work and to close the contact members upon discontinuance of the welding current.

15. In electrical welding wherein electrodes are applied to the work with pressure, the method which comprises, establishing a current in a welding circuit, flowing said current across a shunt from one electrode to the other whereby a circuit for said current is completed, moving the electrodes into engagement with the work by power supplied by said current, and breaking the shunt upon the application of the electrodes to the work whereby the circuit is then completed through the work.

16. In electrical welding wherein electrodes are applied to the work with pressure, the method which comprises, establishing a current in a welding circuit, flowing said current across a shunt from one electrode to the other whereby a circuit for the current is completed, moving the electrodes into engagement with the work, and breaking the shunt upon the application of the electrodes to the work whereby said circuit is then completed through the work.

17. In electrical welding wherein electrodes are applied to the work with pressure, the method which comprises, establishing a current in a welding circuit, flowing the current across a shunt from one electrode to the other whereby a circuit for the current is completed through the shunt, moving the electrodes into engagement with the work by power supplied incident to the establishment of said current, and breaking the shunt upon the application of the electrodes to the work whereby the circuit is completed through the work.

18. In electrical welding wherein electrodes are applied to the work with pressure, the method which comprises, establishing a current in a welding circuit, flowing the current across a shunt from one electrode to the other whereby a circuit for the current is completed through the shunt, moving the electrodes into engagement with the work by power supplied by said current, and breaking the shunt subsequent to the application of the electrodes to the work with requisite pressure, whereby substantially no current passes through the work until pressure is applied thereto by the electrodes and whereby the circuit is completed through the work only subsequent to the application of the electrodes to the work with requisite pressure.

19. In electrical welding wherein electrodes are applied to the work with pressure, the method which comprises, establishing a current in a welding circuit, flowing said current across a shunt from one electrode to the other whereby a circuit for the current is completed, moving the electrodes into engagement with the work by power supplied by said current, and breaking the shunt subsequent to the application of the electrodes to the work with requisite pressure, whereby substantially no current flows through the work prior to the breaking of the shunt and whereby the circuit is completed through the work only subsequent to the application of the electrodes to the work with requisite pressure.

20. In electrical welding wherein electrodes are applied to the work with pressure, the method which comprises, first establishing a current in a welding circuit and flowing the current across shunt from one electrode to another whereby substantially no current flows across the electrodes through the work, moving the electrodes into engagement with the work by power supplied by said current, and breaking the shunt upon the application of the electrodes to the work with requisite pressure, whereby the circuit is then completed through the work only, to perform the welding operation.

EDWIN F. LABADIE.